(12) United States Patent
Michel

(10) Patent No.: US 6,385,130 B1
(45) Date of Patent: May 7, 2002

(54) DUAL CHANNEL SWITCH WITH FREQUENCY BAND LIMITING

(75) Inventor: Claude D. Michel, Fall River, MA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/659,676

(22) Filed: Sep. 11, 2000

(51) Int. Cl.[7] .................................................. G01S 3/80

(52) U.S. Cl. ........................ 367/124; 367/118; 367/129

(58) Field of Search ................................ 367/118, 124, 367/129, 135, 6

(56) References Cited

U.S. PATENT DOCUMENTS

| | | | | | |
|---|---|---|---|---|---|
| 3,320,576 | A | * | 5/1967 | Dixon et al. ................. | 367/135 |
| 3,859,621 | A | * | 1/1975 | Foreman ...................... | 367/127 |
| 4,198,705 | A | * | 4/1980 | Massa .......................... | 367/126 |
| 4,581,727 | A | * | 4/1986 | Harper et al. ................ | 367/118 |
| 4,604,738 | A | * | 8/1986 | Aggarwal et al. ........... | 367/135 |
| 5,341,347 | A | * | 8/1994 | Ludwig ....................... | 367/129 |

* cited by examiner

Primary Examiner—Ian J. Lobo
(74) Attorney, Agent, or Firm—Michael J. McGowan; Prithvi C. Lall; Michael F. Oglo

(57) ABSTRACT

An acoustic switch, having a predetermined frequency response, is disclosed that allows for a single channel device to be interconnected to multiple transducers. The acoustic switch ensures that the signals from the transducer closest to transmitter, which has a highest possible input level, is supplied to the single channel device for processing.

9 Claims, 5 Drawing Sheets

DUAL CHANNEL SWITCH WITH FREQUENCY BAND LIMITING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to acoustically activated switches and, more particularly, to an acoustically activated switch with frequency band limiting that serves as an adapter to interconnect a single input device with multiple transducers each producing a non-synchronized signal, and with the adapter providing an output representative of the first to be received signal generated by the multiple transducers.

(2) Description of the Prior Art

Acoustic switches activated by audible sound are known and serve a variety of functions, such as those being used at sea and which are interconnected to transducers, such as hydrophones located on the port and starboard sides of the ships. Devices that respond to signals received from transponder are known and some of which are disclosed in U.S. Pat. Nos. 3,320,576; 4,604,738; and 5,341,347.

At-sea systems may advantageously employ communication modulation techniques, such as a frequency-shift keying (FSK) technique that shifts a carrier frequency over a range of a few hundred hertz. The FSK technique provides modulation that merges binary data into the carrier and creates only two changes in frequency; one for a logic "0", another for a logic "1". For such at-sea systems for certain applications, it is important that the at-sea system respond to the input from the hydrophone that provides the highest level of signal. The signal at the highest level is most likely generated by the hydrophone located nearest the at-sea system. Furthermore, it is important that the signals from the hydrophones not be intermingled with each other, which would otherwise lead to corruption of the associated signals resulting in a possible unrecognizable bit pattern. All of these possible drawbacks may occur for a system having a single channel input, but required to accept input signals generated from multiple transducers.

It is desired that a acoustic switch be provided that interconnects multiple transducers, each receiving an (FSK) signal, to a single channel device and ensures that the signal from the transducer closest to a at-sea system is supplied to the single channel device and also that the FSK signals from the multiple transducers are not mixed, which would otherwise result in a possible unrecognizable bit pattern.

SUMMARY OF THE INVENTION

Accordingly, it is a general purpose and object of the present invention to provide for an acoustically activated switch that allows for a single input channel device to receive acoustic signals, particularly FSK signals, from multiple transducers. It is a further object to provide an acoustic switch that ensures that the signal from the transducer closest to the single channel device is supplied to the single channel input device. Further, it is an object of the present invention to ensure that received signals from the multiple transducers generating FSK signals are not intermingled or mixed, and thus preventing unrecognizable bit patterns.

The present invention provides an acoustic switch serving as an adapter for handling signals from at least two transponders and determines which of the transponders is closest to the adapter. The adapter comprises at least first and second band pass filters for respectively receiving an input signal generated from at least first and second transponders. The first and second band pass filters generate respective filtered A.C. output signals. The adapter further comprises at least first and second full wave rectifiers respectively receiving the filtered A.C. output signals and respectively generating representative D.C. output signals. In addition, the adapter comprises at least first and second level detectors respectively receiving the D.C. output signals and respectively generating an output signal when the level of the received D.C. output signal is greater than a predetermined threshold. The adapter further comprises a threshold detector receiving the output signals of god the first and second level detectors. The adapter further comprises an output driver receiving the output signal of the threshold detector and the output signals of the first and second band pass filters. The output driver generates an output signal derived from the transponder closest to the adapter.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENTS

Figure 1:
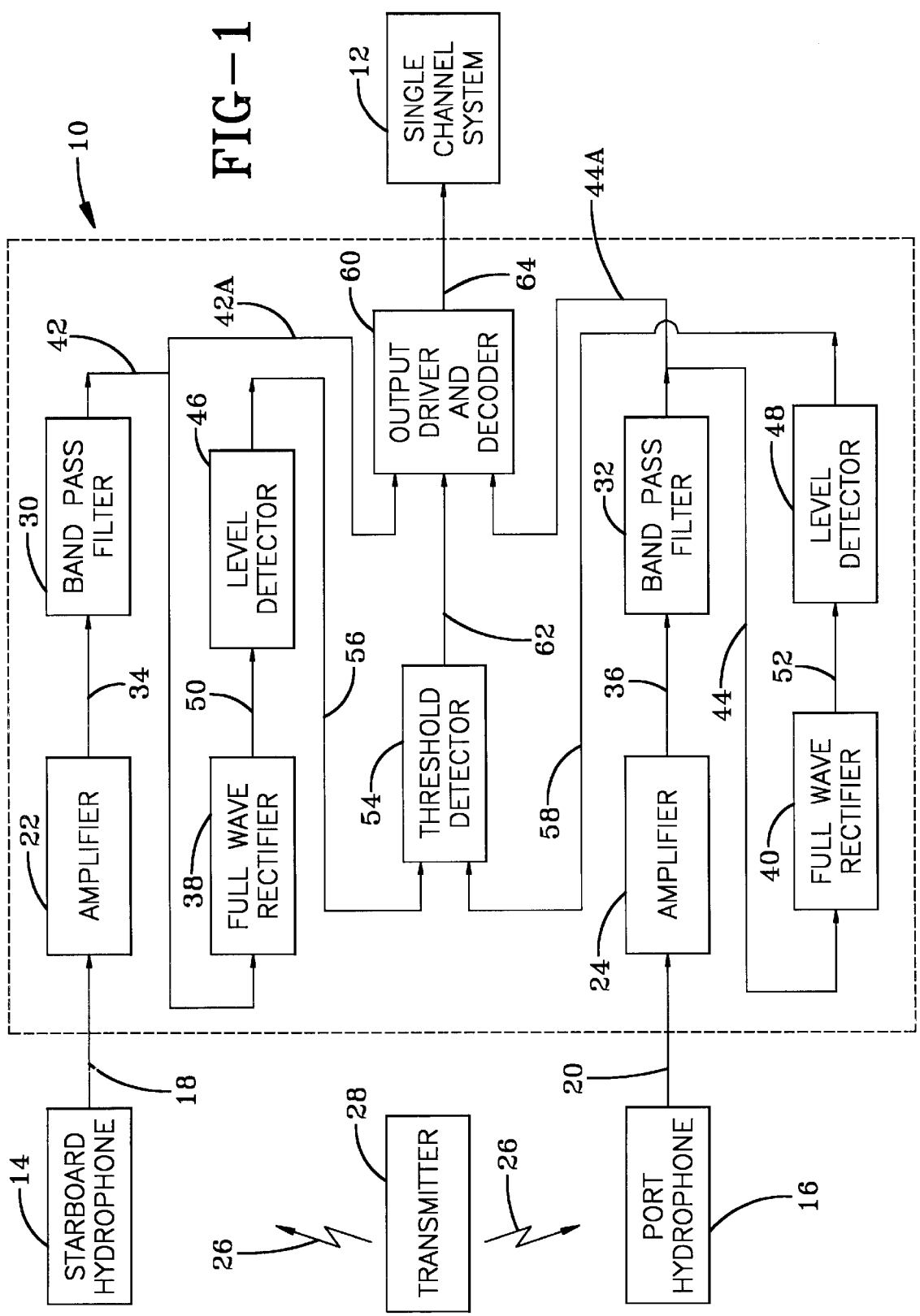
FIG. 1 is a block diagram of the present invention.

With reference to the drawings, there is shown in FIG. 1 a block diagram of an acoustic switch 10 serving as an adapter with frequency band limiting operations. The acoustic switch 10 has a predetermined frequency band pass and adapts a single channel system 12, so that it may be interconnected to multiple transducers 14 and 16, each generating non-synchronized output signals which are respectively applied, via signal paths 18 and 20, to amplifiers 22 and 24 respectively. The transducers 14 and 16 are in one instance respectively, starboard and port hydrophones, each of which receive a signal 26 transmitted from a transmitter 28. The terms "hydrophones," and "active channels," may be used herein in an interchangeable manner. Similarly, the outputs of the port and starboard hydrophones may be respectively referred to herein as port and starboard inputs. The acoustic switch 10 ensures that the signal from the hydrophones 14 and 16, which is closest to the transmitter 28, and thus which would represent the highest input level having the highest probability of correctness, is supplied to the single channel system 12.

The signal 26 is preferably generated by a frequency shift-keyed (FSK) communication technique. The signal 26 may be an acoustic 19 bit frequency shift-keyed (FSK) signal comprised of a carrier signal having a frequency in the range from about 9300 hertz to about 9660 hertz. In the embodiment, the signal may be a signal that represents a shutdown signal for the single channel system 12.

In general, the acoustic switch 10 preferably comprises amplifiers 22 and 24 that respectively receive the signals 18 and 20 and which respectively supply amplified signals to band pass filters 30 and 32 respectively by way of signal paths 34 and 36. The band pass filters 30 and 32 generate respective filtered A.C. output signals, which are respectively routed to full wave rectifiers 38 and 40 by way of signal paths 42 and 44, and to output driver and decoder 60 by way of signal paths 42A and 44A respectively. Full wave rectifiers 38 and 40, respectively generate a representative D.C. output signal that is routed to level detectors 46 and 48 by way of signal paths 50 and 52, respectively. The level detectors 46 and 48 supply output signals to a threshold detector 54 by way of signal paths 56 and 58, respectively. Threshold detector 54 supplies an output signal to an output driver and decoder 60 by way of signal path 62 which, in turn, supplies an output signal to the single channel system 12 by way of signal path 64. Further details of the present invention may be further described with reference to FIGS. 2–6, each illustrating a plurality of elements of the conventional types and having representative values and arranged as shown therein.

Figure 2:
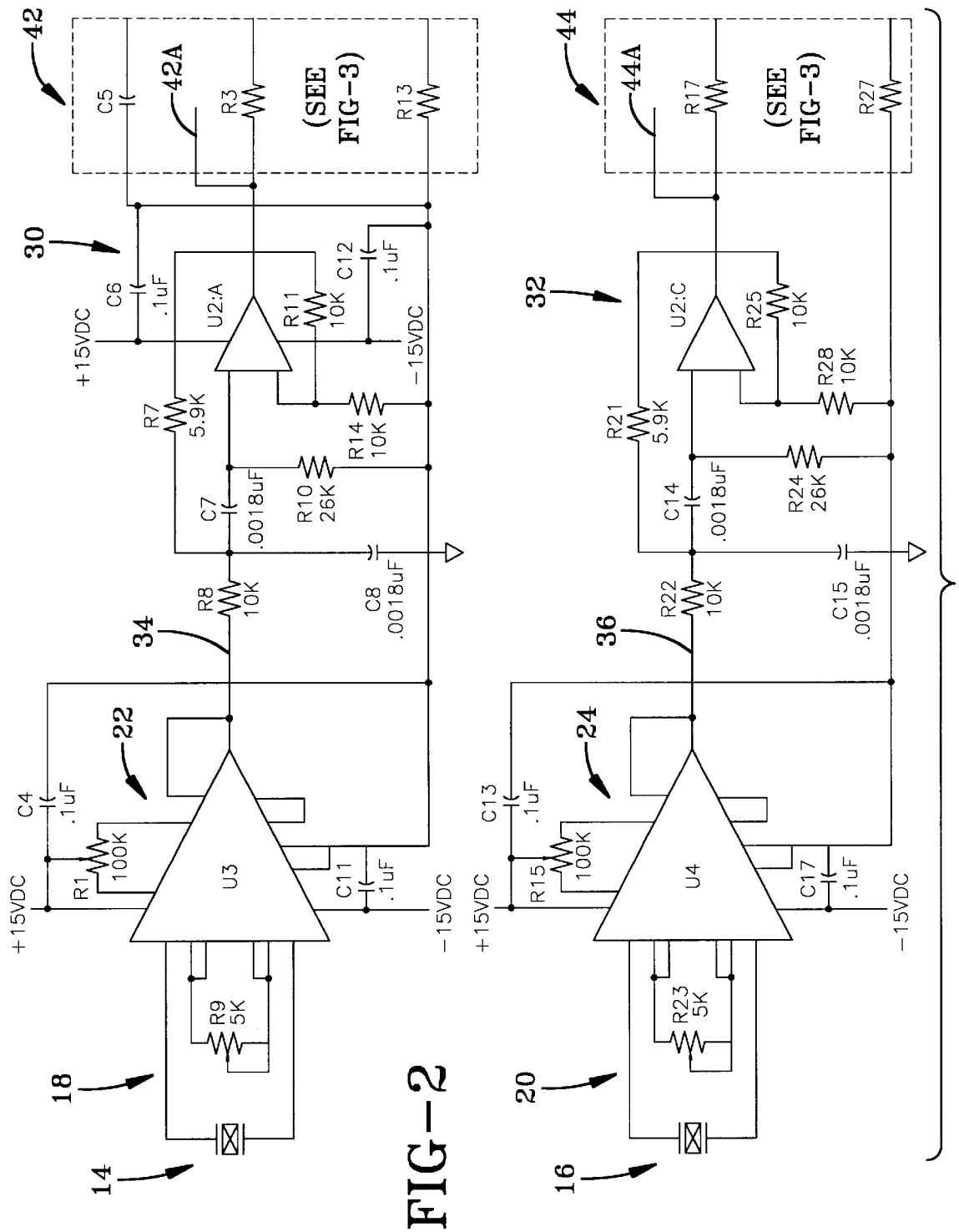
FIG. 2 illustrates details of amplifiers and band pass filters shown in the block diagram of FIG. 1.

FIG. 2 illustrates the signal from the starboard hydrophone 14 on signal path 18 as being received by the amplifier 22 and the signal from the port hydrophone 16 on signal path 20 as being received by the amplifier 24. The amplifiers 22 and 24 apply 20 decibels of gain to the received signals and the outputs of amplifiers 22 and 24 are respectively applied to the band pass filters 30 and 32 by way of the signal paths 34 and 36.

The band pass filters 30 and 32 are preferably selected to have a center frequency of 9400 hertz. Each of the band pass filters 30 and 32 are used to block undesirable, outer band, acoustic signals and noise above and below the frequency band of interest (9300 to 9600 hertz) so as to avoid false triggering of the single channel system 12 which, in one embodiment, serves as a remote shutdown system (RSS). The outputs of the band pass filters 30 and 32 are respectively applied to the full wave rectifiers 38 and 40 of FIG. 3 by way of signal paths 42 and 44, and to, by way of signal paths 42A and 44A, output driver and decoder 60 for processing once the channel select process is complete in a manner as to be described with reference to FIG. 5.

Figure 3:
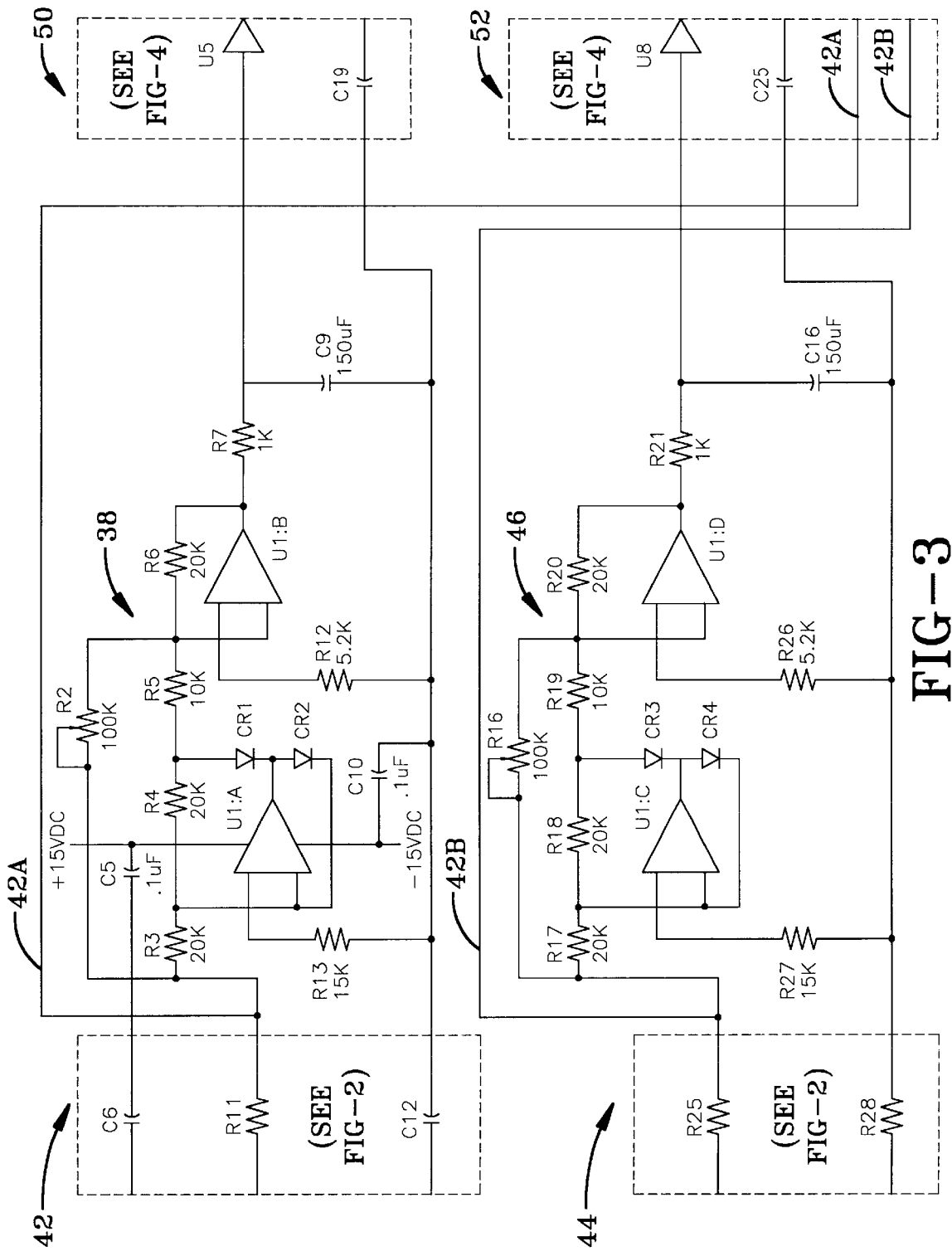
FIG. 3 illustrates details of the full-wave rectifiers shown in the block diagram of FIG. 1.

As shown in FIG. 3, the full wave rectifiers 38 and 40 transform the alternating current (AC) components into a respective direct current (DC) voltage level. The DC voltage level of the full wave rectifiers 38 and 40 are set by R2 and R16 respectively. The DC outputs of the full wave rectifiers 38 and 40 are respectively applied to level detectors 46 and 48 of FIG. 4 by way of signal paths 50 and 52.

Each of the level detectors 46 and 48 has an output threshold both of which may be adjusted by resistor R30. Once the output threshold is set, the DC offset of the two level detectors 46 and 48 are balanced by the adjustment of resistor to R36 and R38, respectively, for the starboard and port channels, respectively, resulting in one embodiment of a transistor-transistor logic (TTL) high (5VDC) output from the level detectors 46 and 48, which are both applied to the threshold detector 54 by way of signal paths 56 and 58 respectively.

The threshold detector may be a programmable array logic (PAL) component which comprises programmable logic chip (PLC) technology and may be made available from Advanced Micro Devices.

Figure 4:
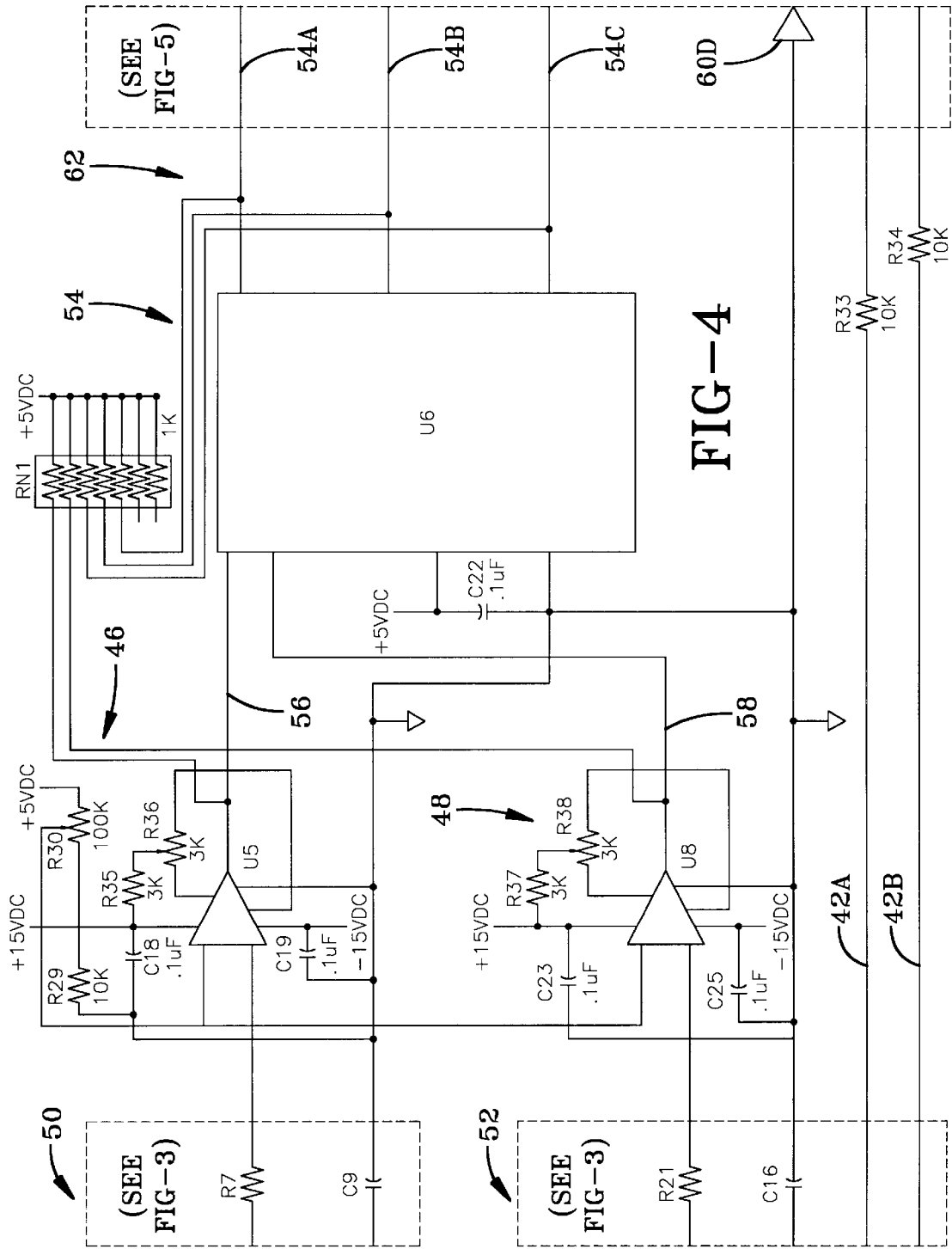
FIG. 4 illustrates details of the level detectors and threshold detector shown in the block diagram of FIG. 1.
Figure 5:
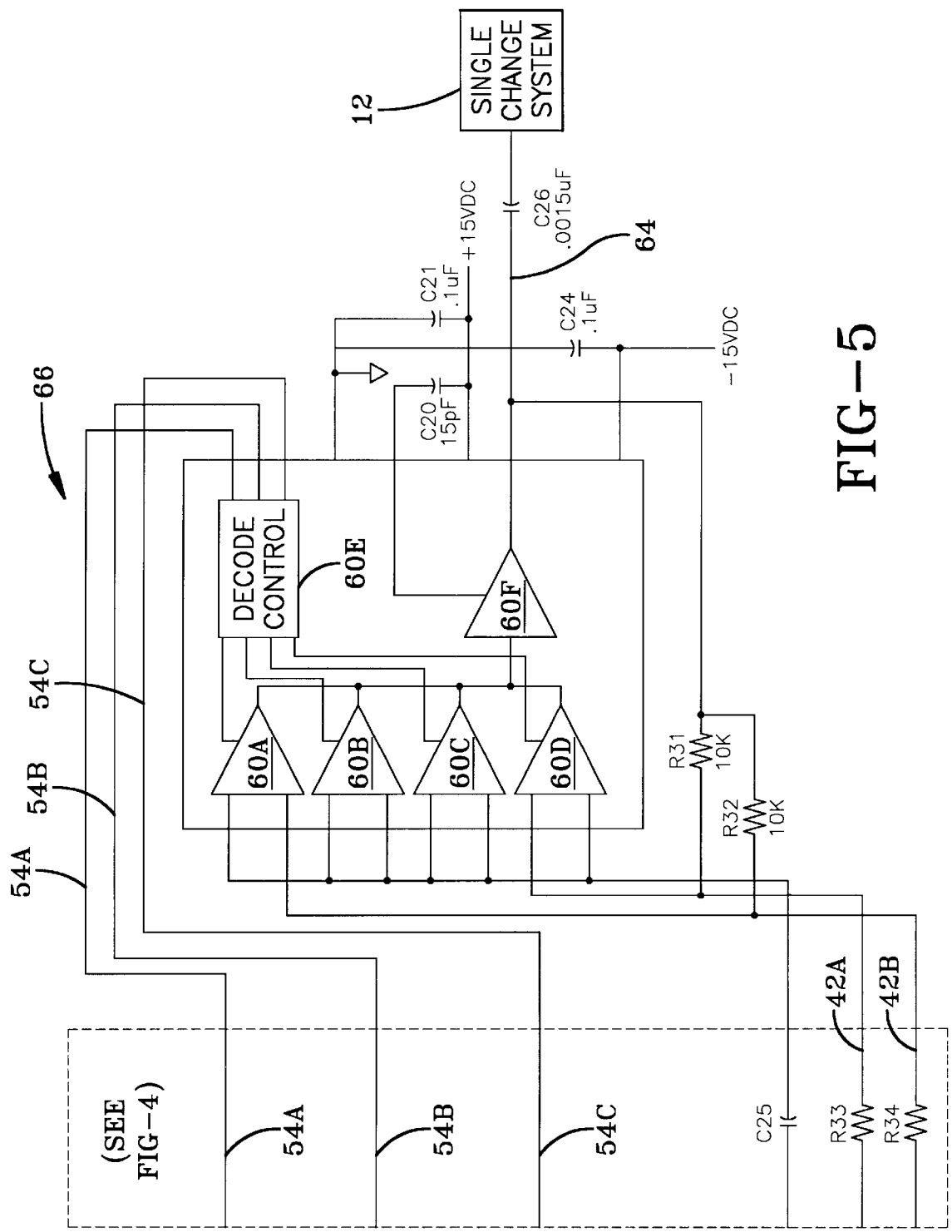
FIG. 5 illustrates details of the output driver and decoder shown in the block diagram of FIG. 1.

In operation, the first full wave rectifier 38 or 40 to reach the set threshold of the level detectors, that is, the threshold set by resistor R30, will be the first TTL (high) output to be applied to the threshold detector 54 as shown in FIG. 4 and FIG. 5. The threshold detector is preferably programmed so that the state of the outputs (TTL levels) on its signal path 54A and 54B is determined by which of the level detectors 46 and 48, respectively generating an output on signal paths 56 and 58, respectively, is the first from the level detectors 46 and 48. The output of the threshold detector 54, in particular the output on signal path 54C, will only be set to a TTL high level when a valid input from an active channel is received. More particularly, the threshold detector 54 only set a TTL high level on signal path 54C when a signal from either level detector 46 and 48, respectively serving the starboard hydrophone 14 and port hydrophone 16, is received. This received signal is used to enable the threshold detector 54 which, in turn, activates signal path 54C. The logic response for the threshold detector 54 is given in Table 1.

TABLE 1

| First Received Signal From | Level on Signal Path 56 | Level on Signal Path 58 | Level on Signal Path 54C |
| --- | --- | --- | --- |
| Starboard Hydrophone 14 | TTL High | TTL Low | TTL High |
| Port Hydrophone 16 | TTL Low | TTL High | TTL High |
| No Received Signal | TTL Low | TTL Low | TTL Low |

The output of the threshold detector 54 on signal paths 54A, 54B and 54C, are applied to a decode control 60E of the output driver and decoder 60 of FIG. 5. The decode control 60E performs logic decoding. The results of a decoding process determines whether the starboard or port inputs from the band pass filters 30 and 32, applied to output driver and decoder 60, via signal paths 42A and 42B, are allowed to be routed to the single channel input system 12. More particularly, if the starboard hydrophone input signal was received first and exceeded the threshold level set by resistor R30, then the output driver and decoder 60, more particularly, amplifiers 60D and 60F generate an output signal, shown as FSK OUT, to the single channel system 12 which, in turn, for one embodiment responds by shutting itself down. Contrary, if the port hydrophone input signal was received first and exceeded the threshold level set by resistor R30, then the output driver and decoder 60, more particularly, amplifiers 60A and 60F generate the output signal, FSK OUT, to the single channel system 12.

It should now be appreciated that the practice of the present invention ensures that the signal from the transducer, such as the starboard or port hydrophone, closest to the transmitter 22, which provides the highest input level relative to each other, is used and directed to the single channel system 12. Further, it should be appreciated that the practice of the present invention inhibits corruption of the received signals from the transducers, such as the port and starboard hydrophones, which would occur if the two channels would somehow be mixed and therefore possibly create an unrecognizable FSK pattern.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An adapter for handling signals from at least two transponders and determining which of the transponders is closest to said adapter, said adapter comprising:

at least first and second band pass filters for respectively receiving an input signal generated from at least first and second transponders, said first and second band pass filters generating respective filtered A.C. output signals;

at least first and second full wave rectifiers respectively receiving the filtered A.C. output signals and respectively generating representative D.C. output signals;

at least first and second level detectors respectively receiving the D.C. output signals and respectively generating an output signal when the level of the received D.C. output signal is greater than a predetermined threshold;

a threshold detector receiving the output signals of said at least first and second level detectors and in response thereto generating an output signal; and an output driver receiving the output signal of said threshold detector and the outputs of said first and second band pass filters, said output driver generating an output signal derived from the transponder closest to said adapter.

2. The adapter according to claim 1 further comprising at least first and second amplifiers respectively interposed between said at least first and second band pass filters and said at least first and second transponders.

3. The adapter according to claim 1 wherein said signal generated by said at least first and second transponders is an acoustic 19 bit frequency shifted keyed (FSK) signal comprised of a carrier signal having a frequency in the range from about 9300 hertz to about 9660 hertz.

4. The adapter according to claim 1 wherein said first and second transponders are hydrophones.

5. The adapter according to claim 1 wherein said threshold detector is a programmable array logic.

6. The adapter according to claim 4 wherein said at least first and second band pass filter pass a band of frequencies in the range from about 9300 hertz to about 9600 hertz.

7. A method of adapting a single channel device having a predetermined frequency band pass response to be interconnected to multiple transducers each generating non-synchronized output signals, said method comprising the steps of:

receiving and filtering within said predetermined band pass said output signals of said multiple transducers and respectively providing a filtered A.C. output signal therefrom;

receiving and rectifying said filtered A.C. output signals and generating representative D.C. output signals therefrom; and receiving and detecting said D.C. output signals and respectively generating an output signal when the level of the received D.C. output signals are greater than a predetermined threshold; and receiving the threshold output and said A.C. output signals and generating an output signal that is derived from the first to be received A.C. output signal.

8. The method according to claim 7 wherein each of said non-synchronized output signal is an acoustic 19 bit frequency shifted keyed (FSK) signal comprised of a carrier signal having a frequency in the range from about 9300 hertz to about 9660 hertz.

9. The method according to claim 8 wherein said predetermined band pass is in range from about 9300 hertz to about 9660 hertz.

* * * * *